(12) United States Patent
Itou et al.

(10) Patent No.: US 10,409,124 B2
(45) Date of Patent: Sep. 10, 2019

(54) LIQUID CRYSTAL DISPLAY DEVICE

(71) Applicant: Japan Display Inc., Minato-ku (JP)

(72) Inventors: Osamu Itou, Tokyo (JP); Daisuke Sonoda, Tokyo (JP); Masahiro Kosuge, Tokyo (JP)

(73) Assignee: Japan Display Inc., Minato-ku (JP)

( * ) Notice: Subject to any disclaimer, the term of this patent is extended or adjusted under 35 U.S.C. 154(b) by 219 days.

(21) Appl. No.: 15/277,220

(22) Filed: Sep. 27, 2016

(65) Prior Publication Data

US 2017/0090262 A1    Mar. 30, 2017

(30) Foreign Application Priority Data

Sep. 30, 2015 (JP) ................. 2015-193217

(51) Int. Cl.
| | |
|---|---|
| *G02F 1/1362* | (2006.01) |
| *G02F 1/1335* | (2006.01) |
| *G02F 1/1343* | (2006.01) |
| *G02F 1/1337* | (2006.01) |
| *G02F 1/1333* | (2006.01) |

(52) U.S. Cl.
CPC ...... *G02F 1/136286* (2013.01); *G02F 1/1337* (2013.01); *G02F 1/13439* (2013.01); *G02F 1/133345* (2013.01); *G02F 1/133502* (2013.01); *G02F 2001/136222* (2013.01); *G02F 2202/02* (2013.01)

(58) Field of Classification Search
None
See application file for complete search history.

(56) References Cited

U.S. PATENT DOCUMENTS

| | | | |
|---|---|---|---|
| 6,031,512 A | 2/2000 | Kadota et al. | |
| 2011/0051064 A1* | 3/2011 | Matsumori | G02F 1/133711 349/123 |
| 2015/0138480 A1* | 5/2015 | Yi | G02F 1/13439 349/44 |
| 2016/0299395 A1* | 10/2016 | Kosuge | G02F 1/136209 |
| 2016/0334682 A1* | 11/2016 | Zhang | G02F 1/133308 |
| 2017/0170199 A1* | 6/2017 | Zhang | H01L 21/2855 |

FOREIGN PATENT DOCUMENTS

JP     11-24061     1/1999

* cited by examiner

*Primary Examiner* — Edward J Glick
*Assistant Examiner* — Anthony G Quash
(74) *Attorney, Agent, or Firm* — Oblon, McClelland, Maier & Neustadt, L.L.P.

(57) ABSTRACT

According to one embodiment, a liquid crystal display device, includes a first substrate including a scanning signal line, a video signal line, a first electrode, a color filter, a common line in contact with the first electrode along the video signal line, an antireflection layer located on the common line, a transparent layer located on the antireflection layer, and a second electrode, a liquid crystal layer located on the first substrate, and a second substrate located on the liquid crystal layer, the transparent layer having a thickness of 10 nm or more and 40 nm or less.

18 Claims, 18 Drawing Sheets

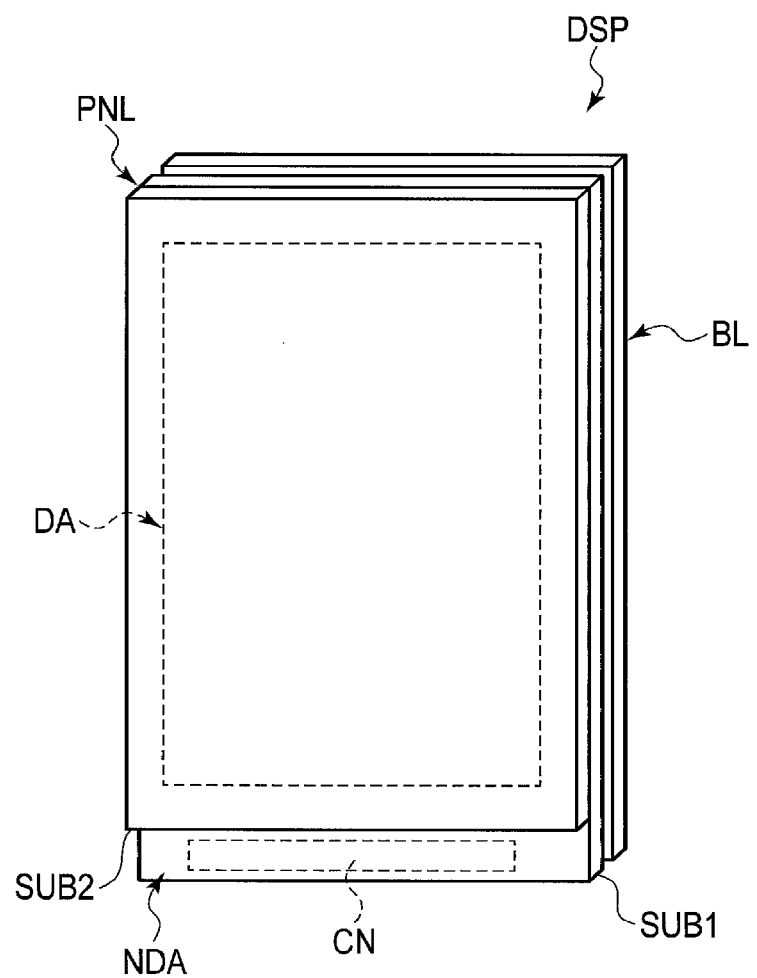
F I G. 1

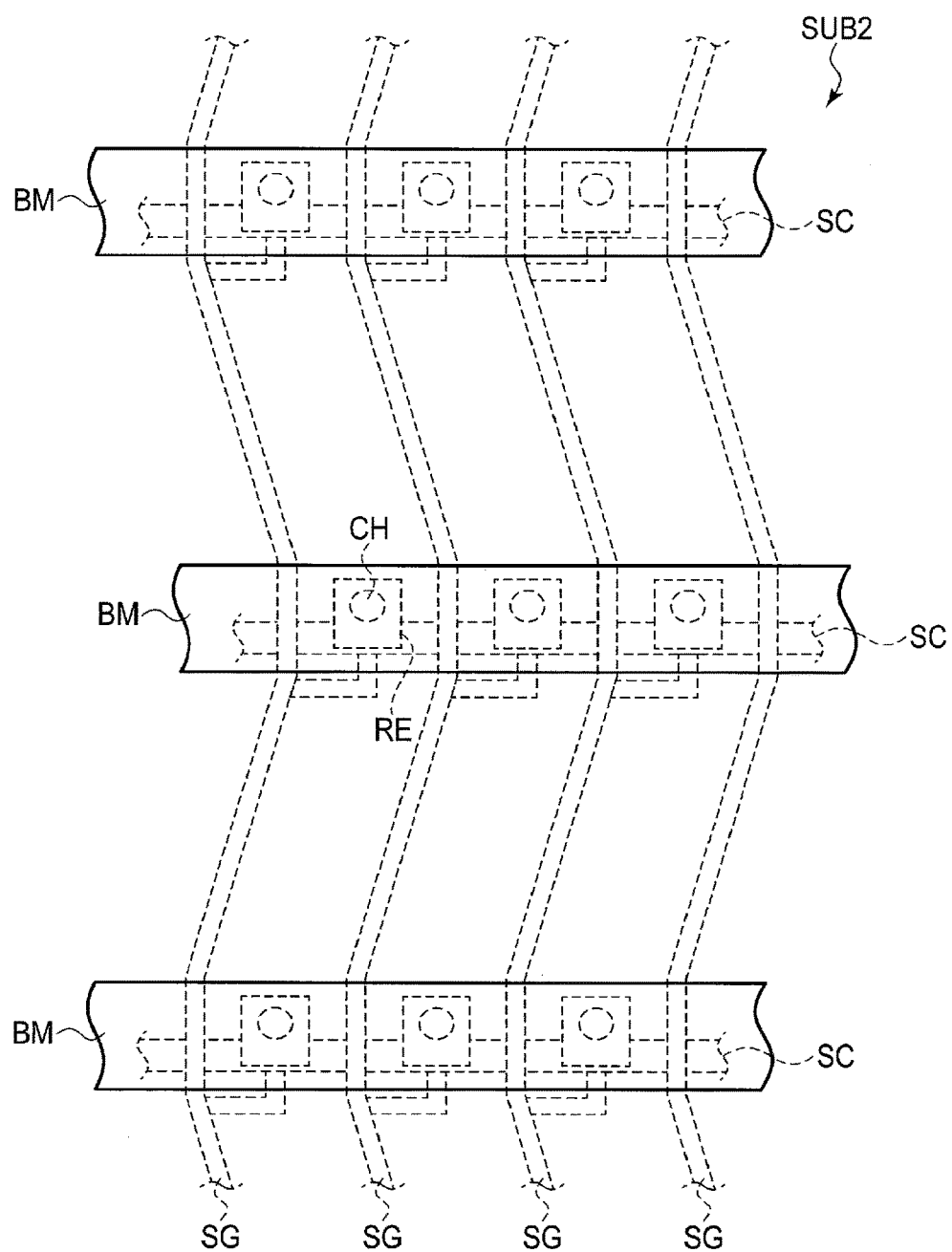
F I G. 3

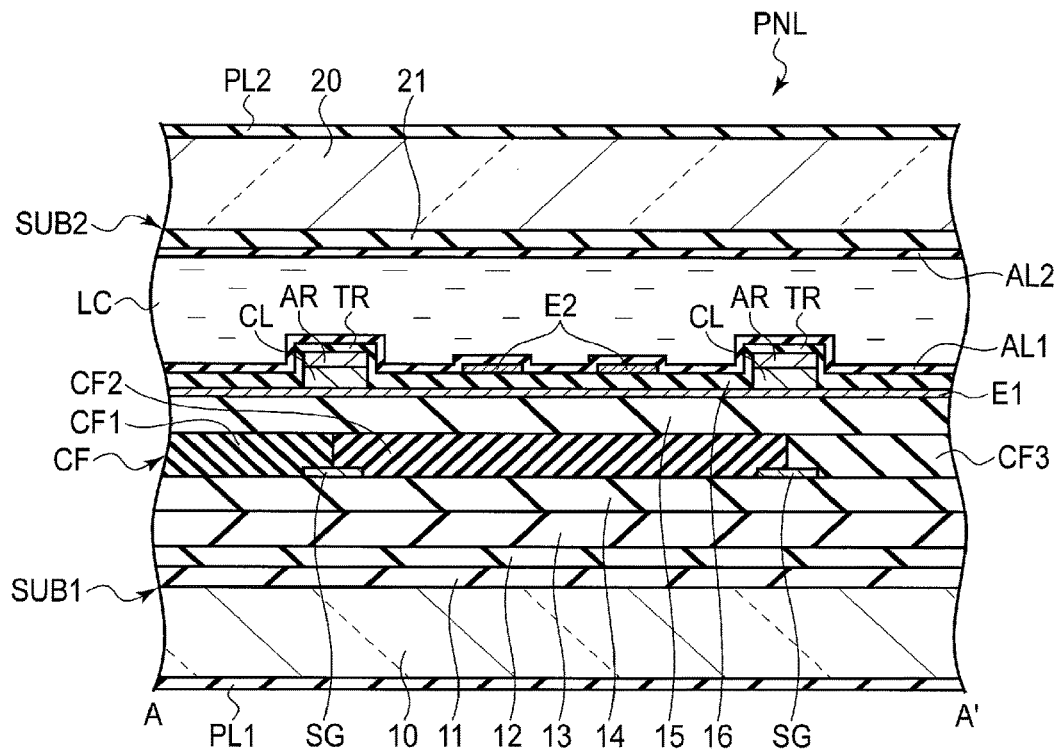
F I G. 4A
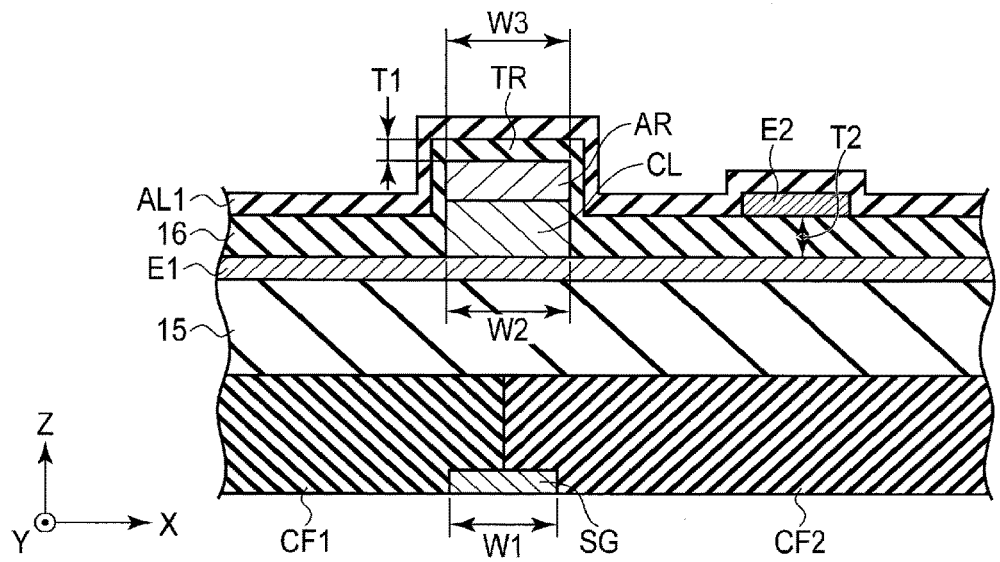
F I G. 4B

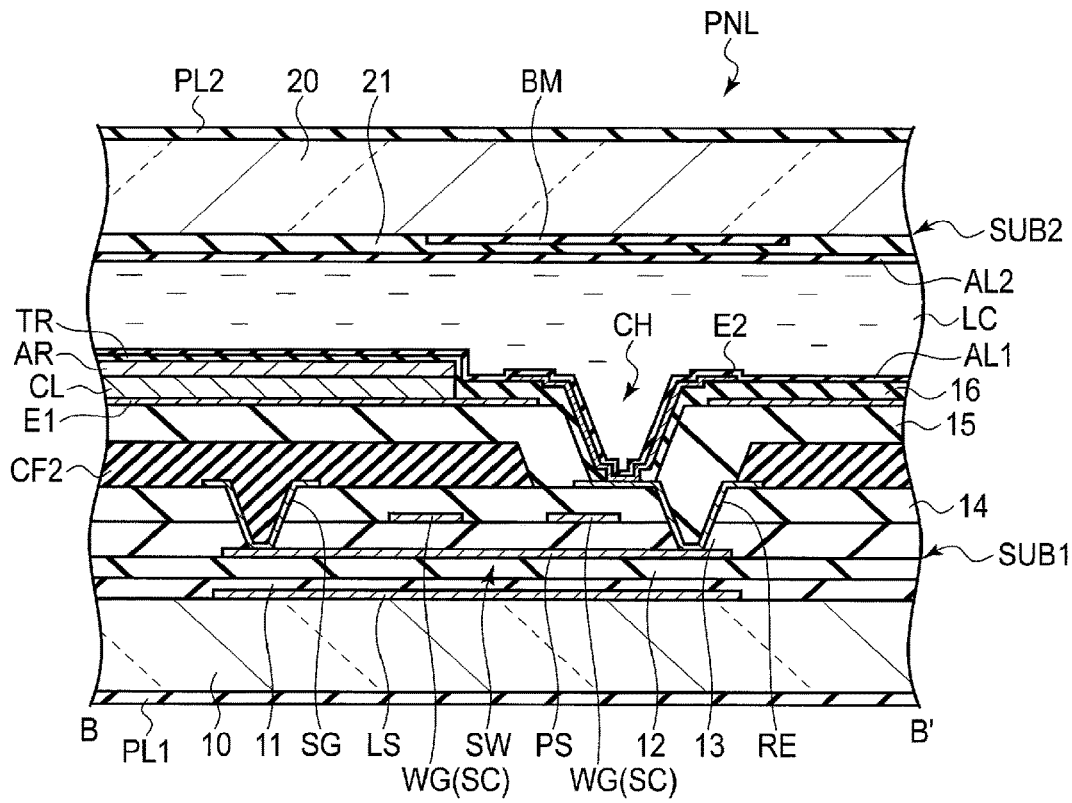
F I G. 5
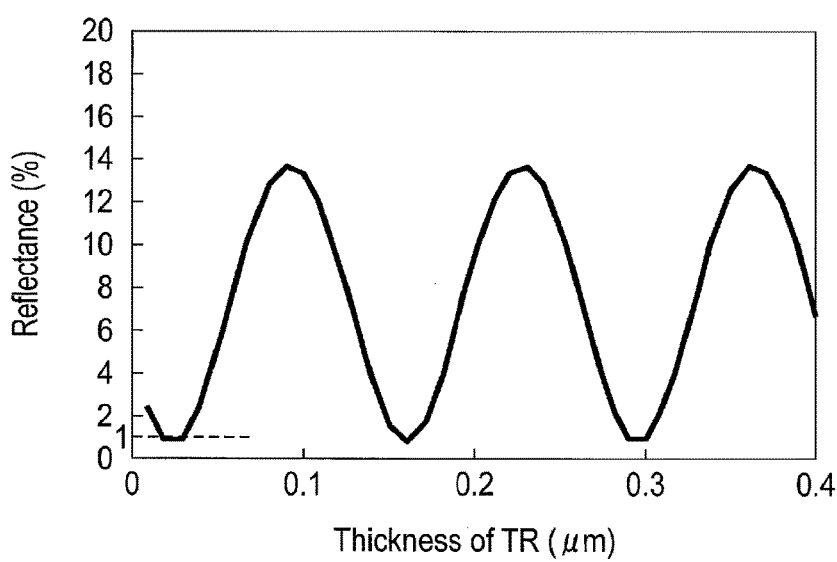
F I G. 6

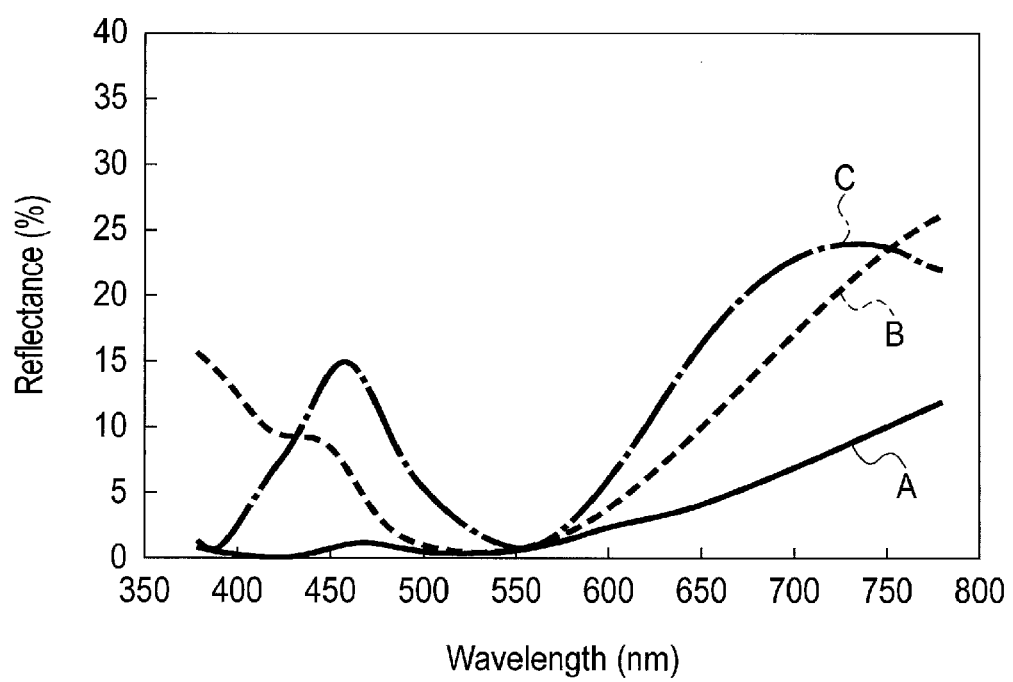
F I G. 7

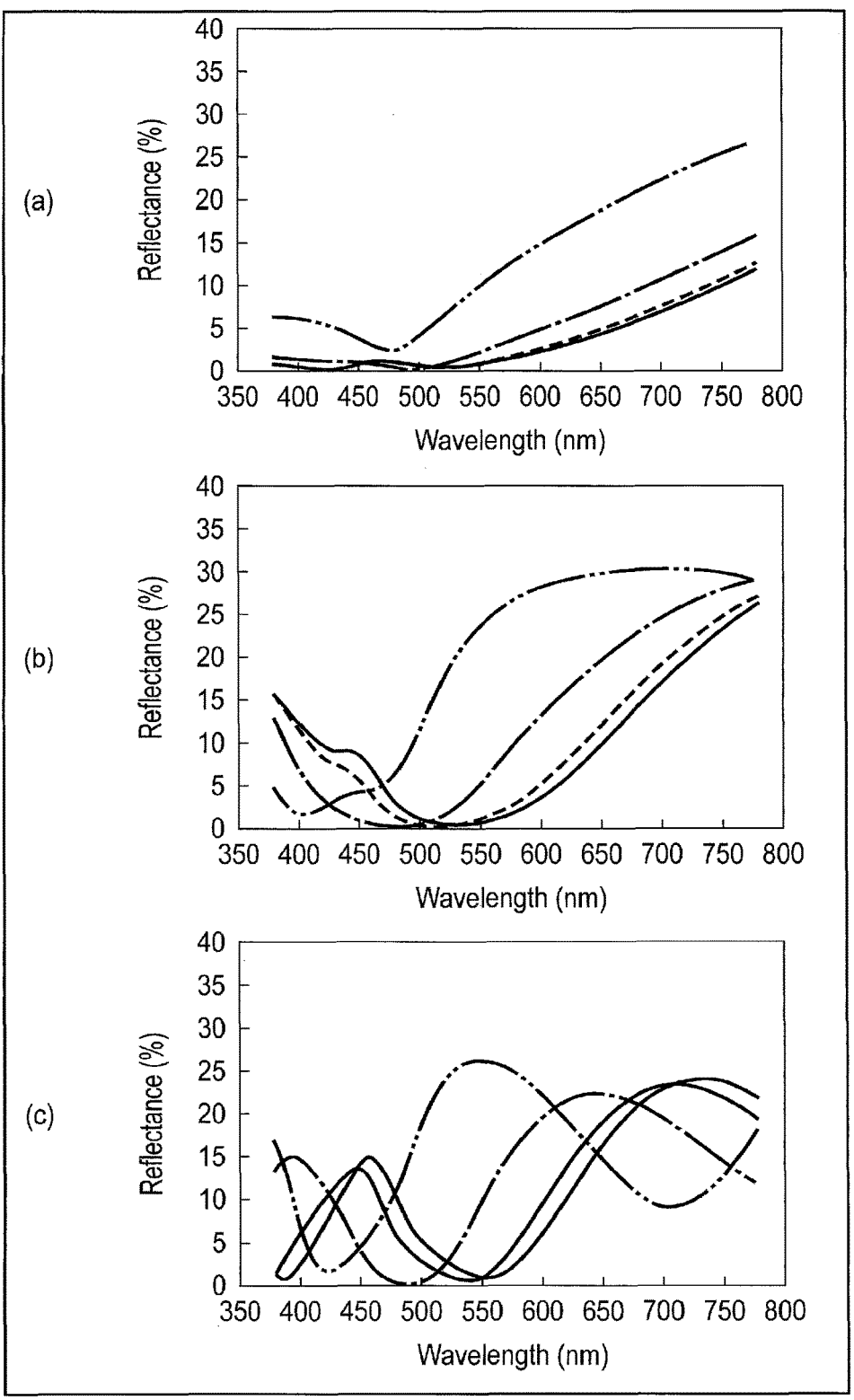
F I G. 8

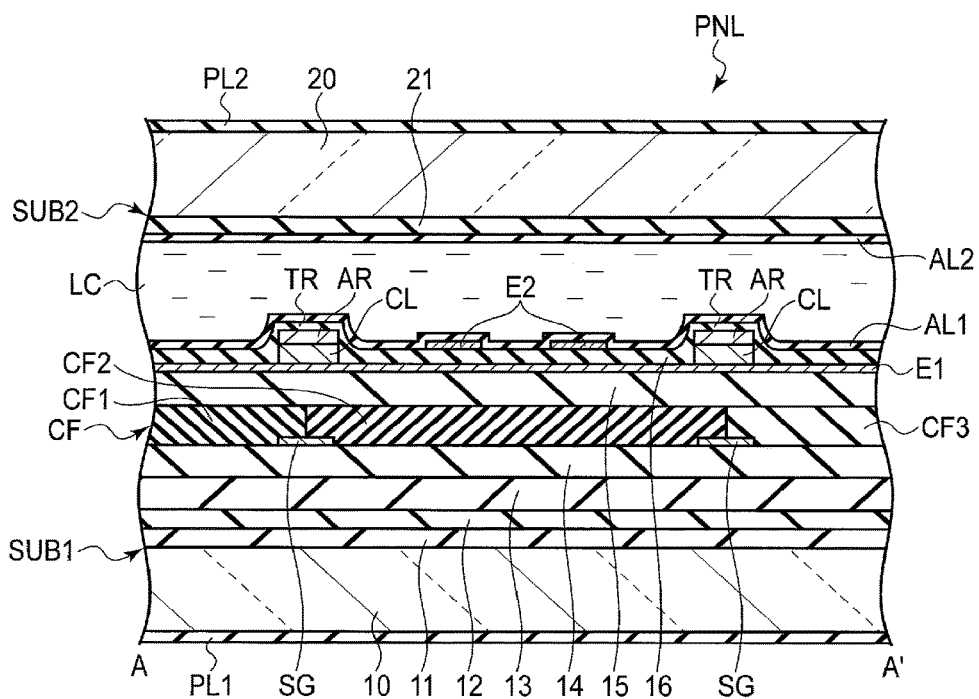
F I G. 10

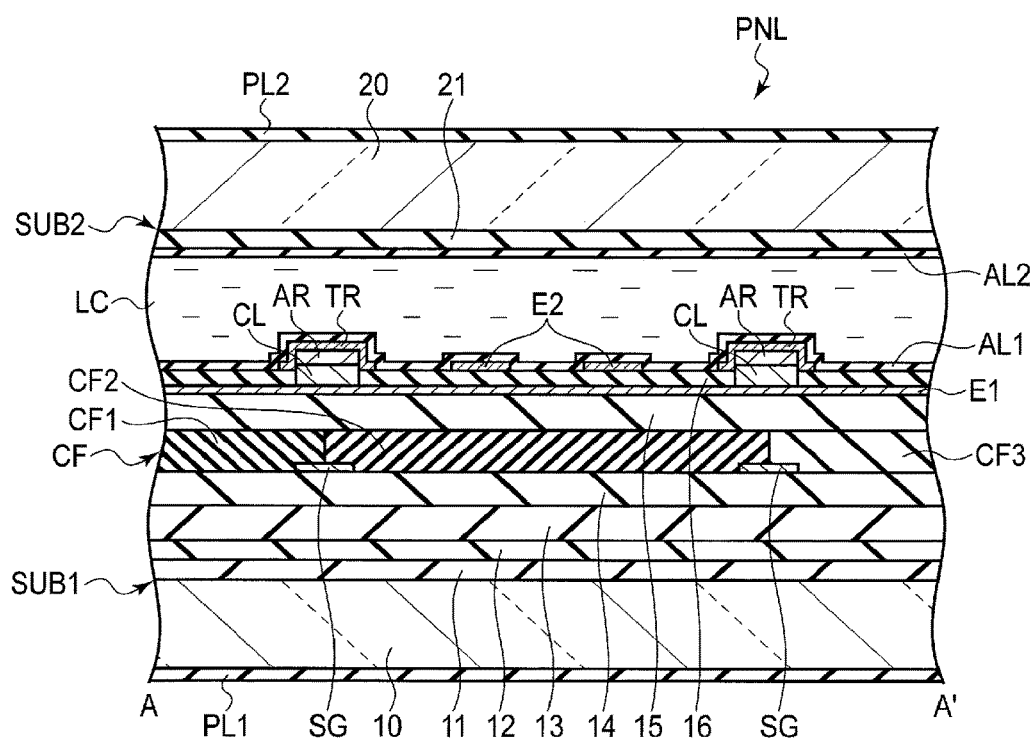
F I G. 11

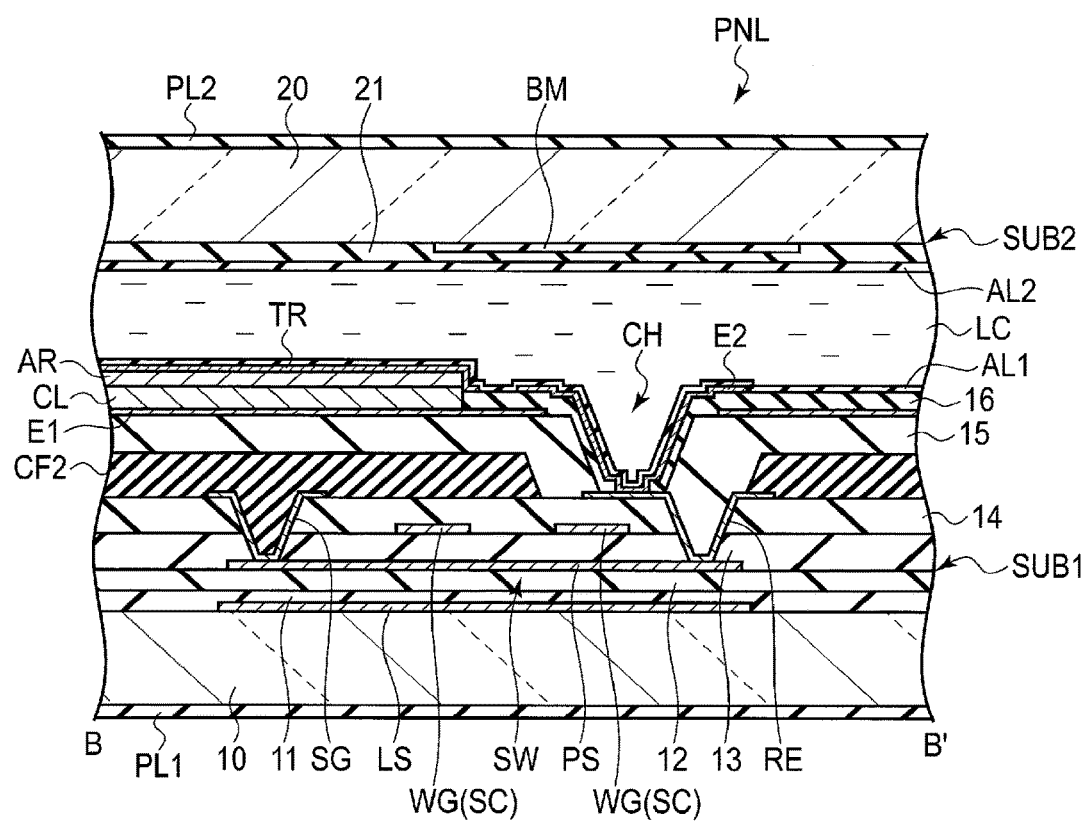
F I G. 12

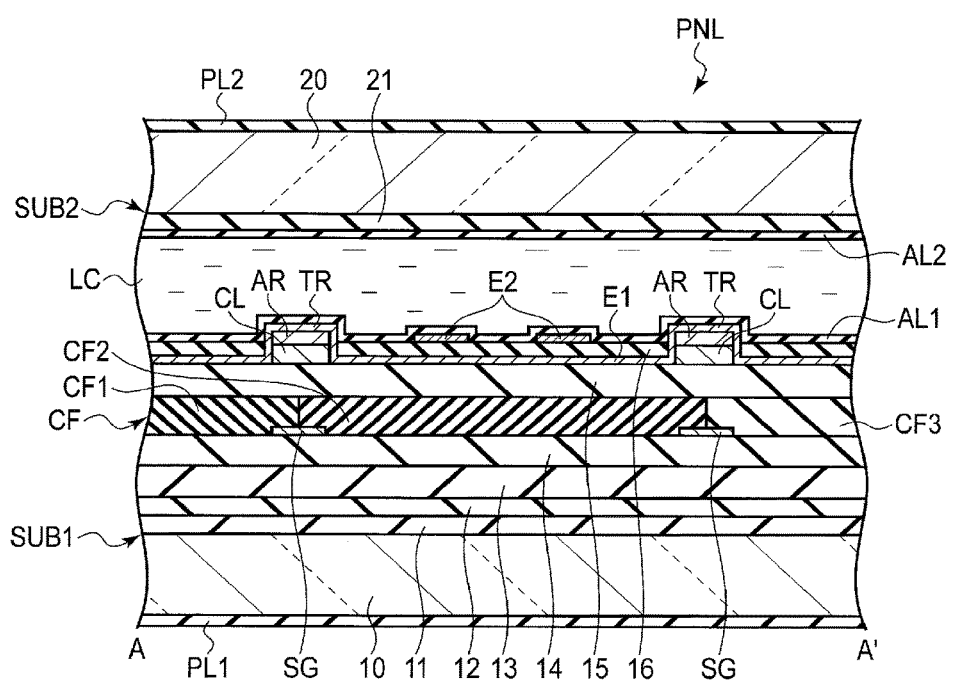
F I G. 13

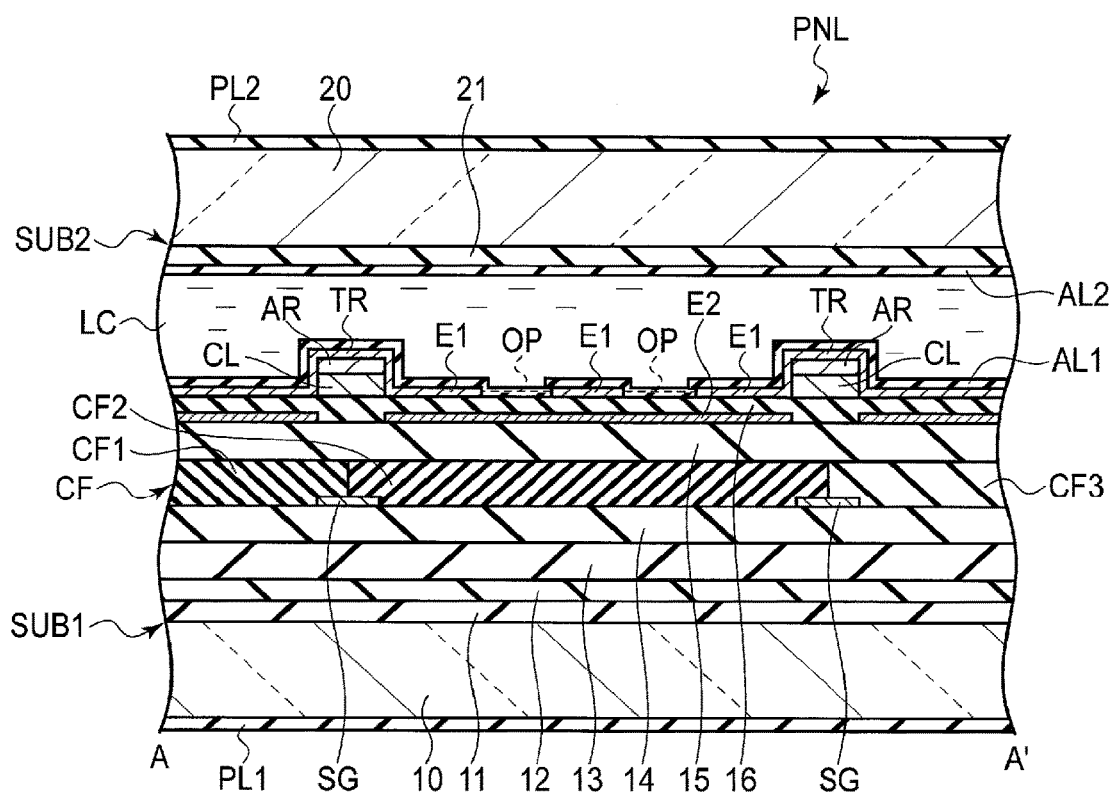
F I G. 16

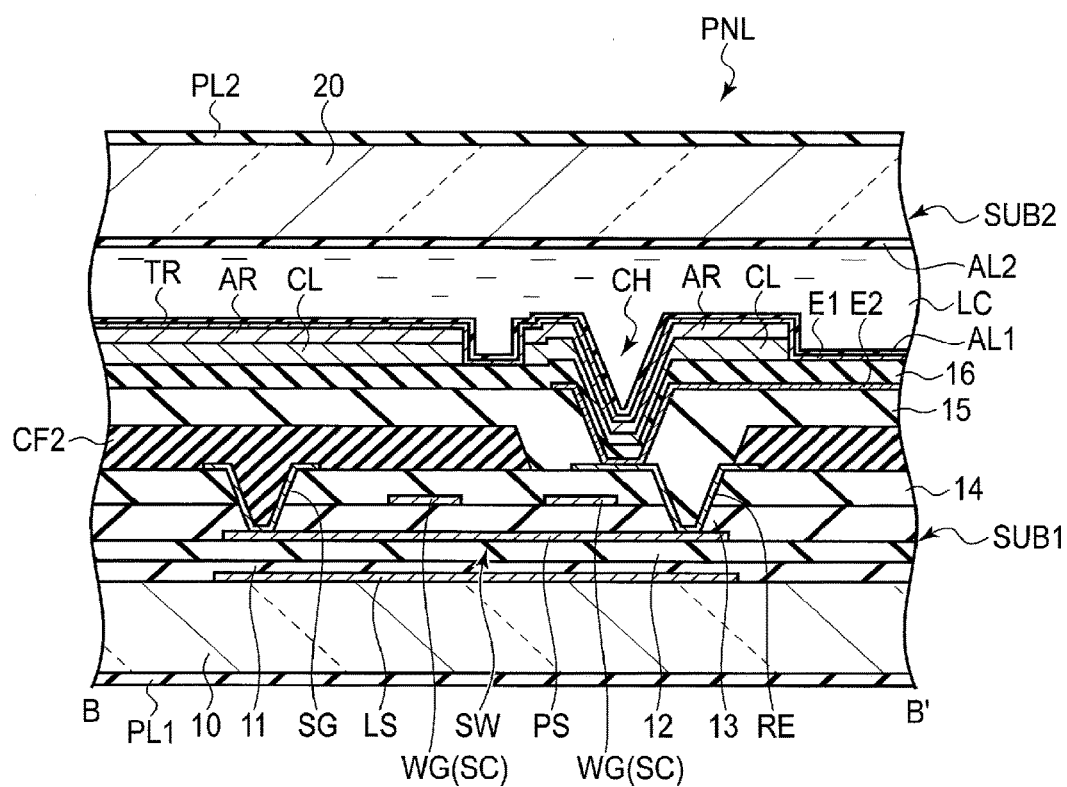
F I G. 18

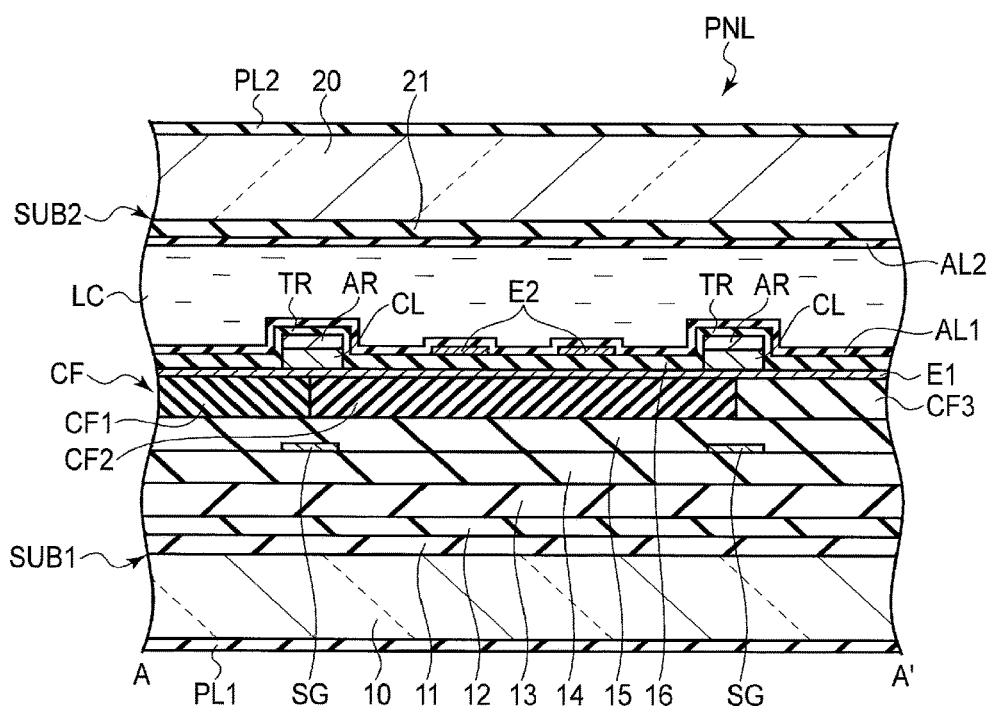
F I G. 19

LIQUID CRYSTAL DISPLAY DEVICE

CROSS-REFERENCE TO RELATED APPLICATIONS

This application is based upon and claims the benefit of priority from Japanese Patent Application No. 2015-193217, filed Sep. 30, 2015, the entire contents of which are incorporated herein by reference.

FIELD

Embodiments described herein relate generally to a liquid crystal display device.

BACKGROUND

Recently, liquid crystal display devices of "Color filter On Array" (COA) type comprising color filters and switching elements formed on the same substrate have been developed. For example, a technology of forming a metallic light-shielding film serving as a drain electrode and a black matrix, has been disclosed.

In the COA type, the degradation in aperture ratio can be suppressed by disposing color filters and metal lines on either of substrates and disposing no light-shielding layer on the other substrate. However, a risk of degrading the contrast ratio may be increased by allowing external light incident via the other substrate to be reflected on the metal lines. For this reason, improvement of the display quality in the COA-type liquid crystal display devices has been required.

BRIEF DESCRIPTION OF THE DRAWINGS

FIG. 1 is a perspective view showing an example of an appearance of a liquid crystal display device DSP.

FIG. 3 is a plan view of the second substrate SUB2.

FIG. 4A is a cross-sectional view showing the display panel PNL in line A-A' of FIG. 2.

FIG. 4B is an enlarged sectional view showing in part the first substrate SUB1 shown in FIG. 4A.

FIG. 5 is a cross-sectional view showing the display panel PNL in line B-B' of FIG. 2.

FIG. 6 is a graph representing dependency of reflectance on a thickness of a transparent layer TR at a wavelength of 555 nm.

FIG. 7 is a graph representing reflection spectra in a case where the thickness of the transparent layer TR satisfies zero-order, first-order, and second-order interference conditions.

FIG. 8 shows graphs representing dependency of the reflection spectra on a polar angle under the interference conditions of the respective orders.

FIG. 10 is a cross-sectional view showing a display panel PNL in Modified Example 1 of Embodiment 1.

FIG. 11 is a cross-sectional view showing a display panel PNL of Embodiment 2.

FIG. 12 is a cross-sectional view showing the display panel PNL of Embodiment 2.

FIG. 13 is a cross-sectional view showing a display panel PNL of Embodiment 3.

FIG. 16 is a cross-sectional view showing a display panel PNL of Embodiment 4.

FIG. 18 is a cross-sectional view showing a display panel PNL of Embodiment 5.

FIG. 19 is a cross-sectional view showing a display panel PNL of Embodiment 6.

DETAILED DESCRIPTION

Figure 2:
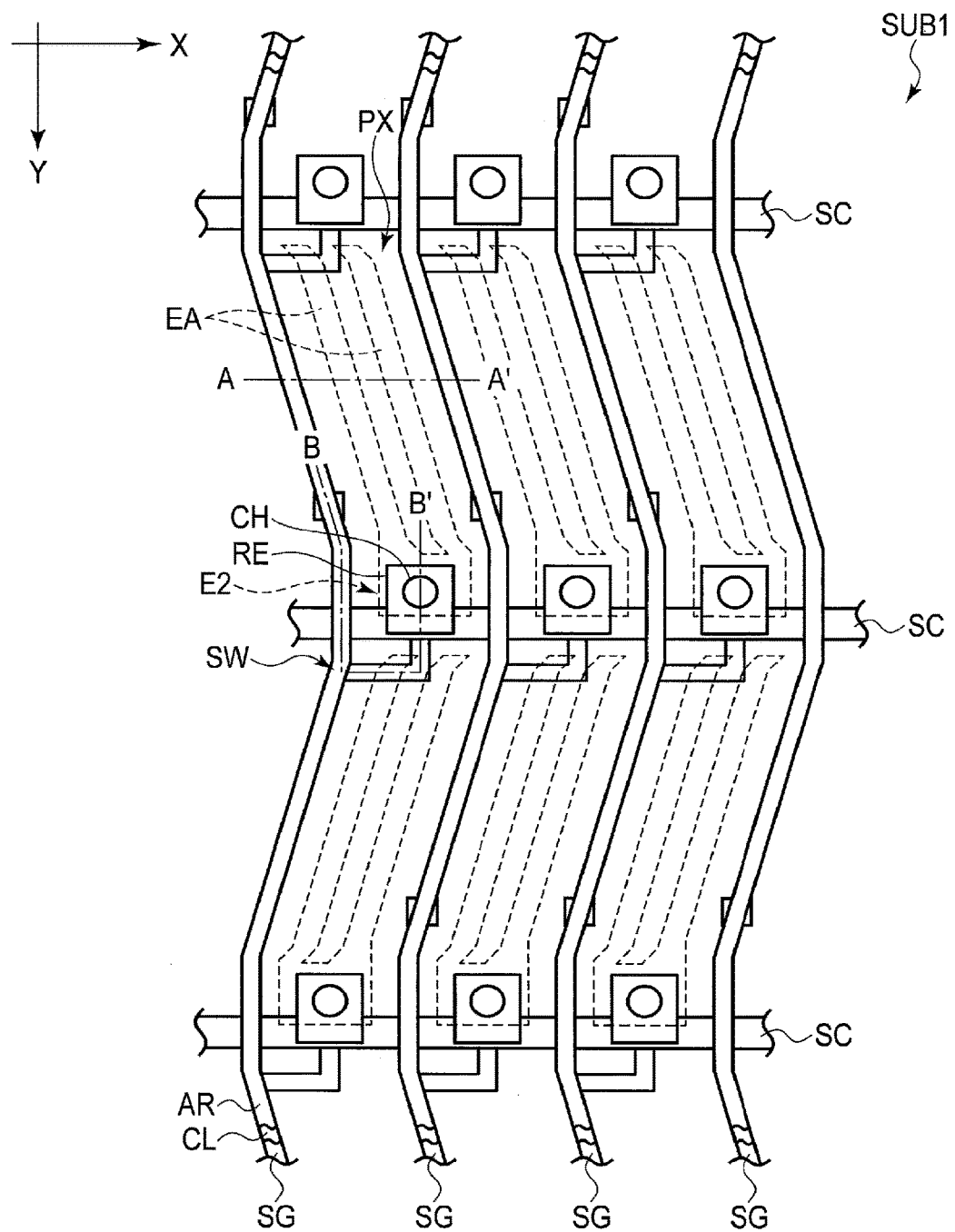
FIG. 2 is a plan view of the first substrate SUB1.

In general, according to one embodiment, a liquid crystal display device, includes: a first substrate including a scanning signal line, a video signal line, a first electrode, a color filter, a common line in contact with the first electrode along the video signal line, an antireflection layer located on the common line, a transparent layer located on the antireflection layer, and a second electrode; a liquid crystal layer located on the first substrate; and a second substrate located on the liquid crystal layer, the transparent layer having a thickness of 10 nm or more and 40 nm or less.

The embodiments will be described hereinafter with reference to the accompanying drawings. The disclosure is a mere example, and arbitrary change of gist which can be easily conceived by a person of ordinary skill in the art naturally falls within the inventive scope. To more clarify the explanations, the drawings may pictorially show width, thickness, shape, etc., of each portion as compared with an actual aspect, but they are mere examples and do not restrict the interpretation of the invention. In the present specification and drawings, elements like or similar to those in the already described drawings may be denoted by similar reference numbers and their detailed descriptions may be arbitrarily omitted.

An example of a liquid crystal display device will be described in each of the embodiments. The liquid crystal display device can be used in, for example, various devices such as a smartphone, a tablet terminal, a mobile telephone terminal, a personal computer, a TV receiver, a vehicle-mounted device, a game console, and a monitor for digital camera.

Embodiment 1

FIG. 1 is a perspective view showing an example of an appearance of a liquid crystal display device DSP.

The liquid crystal display device DSP comprises a display panel PNL and an illumination device BL.

The display panel PNL includes a first substrate SUB1, a second substrate SUB2, and a liquid crystal layer (a liquid crystal layer LC explained later) held between the first substrate SUB1 and the second substrate SUB2. The display panel PNL includes a display area DA and a non-display area NDA. The display area DA is an area for displaying an image. The display area DA is located substantially in the center of the area where the first substrate SUB1 and the second substrate SUB2 are opposed to each other. The non-display area NDA is an area in which no images are displayed, and is located outside the display area DA.

The first substrate SUB1 includes a connection module CN. The connection module CN comprises terminals for connection of a signal supply source such as a flexible printed circuit and an IC chip. The connection module CN is located in the non-display area NDA.

The illumination device BL is disposed on a back surface side of the first substrate SUB1 (i.e., a side opposite to a surface opposed to the second substrate SUB2). Various types of devices are applicable as the illumination device BL. For example, the illumination device BL comprises a light guide plate opposed to the first substrate SUB1, light sources such as light-emitting diodes (LED) disposed along an end portion of the light guide plate, a reflective sheet disposed on one of main surface sides of the light guide plate, various optical sheets deposited on the other main surface side of the light guide plate, and the like.

The display panel PNL in the example illustrated is a transmissive display panel which displays an image by allowing the light from the illumination device BL to be transmitted selectively, but is not limited to this. For example, the display panel PNL may be a reflective display panel which allows an image to be displayed by urging external light or the light from an external light source to be selectively reflected, or a transflective display panel having display functions of both the transmissive display panel and the reflective display panel.

The detailed configuration of the display panel PNL is not explained here but, any one of a display mode using a longitudinal electric field along a normal line of the display panel PNL, a display mode using an oblique electric field which is tilted in a direction oblique to the normal line of the display panel PNL, and a display mode using a lateral electric field along the main surface of the display panel PNL can be applied to the display panel PNL.

In each of the embodiments hereinafter described, a direction from the first substrate SUB1 to the second substrate SUB2 is called an upward direction (or, more simply, upwardly) and a direction from the second substrate SUB2 to the first substrate SUB1 is called a downward direction (or, more simply, downwardly). A view from the second substrate SUB2 to the first substrate SUB1 is called a planar view.

FIG. 2 is a plan view of the first substrate SUB1. A configuration example using a fringe field switching (FFS) mode which is one of the display modes using the lateral electric field will be hereinafter explained. In the drawing, a first direction X and a second direction Y intersect each other.

The first substrate SUB1 includes scanning signal lines SC, video signal lines SG, switching elements SW, relay electrodes RE, first electrodes E1, second electrodes E2, common lines CL, an antireflection layer (or reflection suppressing layer) AR, and the like. In FIG. 2, constituent elements necessary for explanations alone are illustrated, but the first electrodes E1 and the like are not illustrated.

The scanning signal lines SC are arranged in the second direction Y and spaced apart from each other with predetermined intervals interposed. Each of the scanning signal lines SC extends in the first direction X and is shaped in a straight line. The scanning signal lines SC may be bent in part. The video signal lines SG are arranged in the first direction X and spaced apart from each other with predetermined intervals interposed. Each of the video signal lines SG extends substantially in the second direction Y and is bent in part. In the example illustrated, the video signal lines SG located between two adjacent scanning signal lines SC extend in a direction different from the first direction X and the second direction Y. The video signal lines SG may be shaped in a straight line along the second direction Y. In the drawing, each pixel PX corresponds to an area sectioned by two adjacent scanning signal lines SC and two adjacent video signal lines SG.

Each switching element SW is electrically connected with the scanning signal lines SC and the video signal lines SG. Details of the switching element SW will be described later. The relay electrode RE is electrically connected with the switching element SW. The first electrode E1 is a common electrode disposed across the pixels PX. The second electrode E2 is a pixel electrode disposed in each pixel PX as represented in the drawing by a dotted line. The second electrode E2 is electrically connected with the relay electrode RE. In the example illustrated, the second electrode E2 includes two strip electrodes EA. The strip electrodes EA extend substantially parallel to the video signal lines SG. In the drawing, CH denotes a contact hole for electric connection between the relay electrode RE and the second electrode E2.

The common lines CL are disposed along the video signal lines SG. In the example illustrated, the common lines CL are overlaid on the video signal lines SG in planar view. The antireflection layer AR is overlaid on the common lines CL in planar view. The second electrode E2 is remote from the common line CL and the antireflection layer AR in planar view.

FIG. 3 is a plan view of the second substrate SUB2. Main portions of the first substrate SUB1 shown in FIG. 2 are represented by dotted lines.

The second substrate SUB2 includes a light-shielding layer BM and the like. The light-shielding layer BM is overlaid on the scanning signal lines SC, the relay electrodes RE, the contact holes CH and the like in planar view. In contrast, the light-shielding layer BM is not overlaid on the video signal lines SG located between two adjacent scanning signal lines SC.

FIG. 4A is a cross-sectional view showing the display panel PNL in line A-A' of FIG. 2. FIG. 4B is an enlarged sectional view showing in part the first substrate SUB1 shown in FIG. 4A.

The first substrate SUB1 includes a support substrate 10, insulating layers 11, 12, 13, 14, 15 and 16, the video signal lines SG, a color filter layer CF, the first electrode E1, the second electrodes E2, the common lines CL, the antireflection layer AR, an alignment film AL1 and the like. A polarizer PL1 is disposed under the support substrate 10.

The support substrate 10 is transparent and is formed of, for example, glass such as borosilicate glass, but may be formed of resin such as plastic. All the insulating layers 11 to 16 are transparent. The insulating layers 11-14 and 16 are inorganic insulating layers, which are formed of, for example, silicon nitride or silicon oxide. The insulating layer 15 is an organic insulating layer, which is formed of, for example, resin such as acrylic resin. The insulating layer 11 is located on the support substrate 10. The insulating layer 12 is located on the insulating layer 11. The insulating layer 13 is located on the insulating layer 12. The insulating layer 14 is located on the insulating layer 13.

The video signal lines SG are located on the insulating layer 14.

The color filter layer CF is located on the insulating layer 14. The color filter layer CF includes, for example, a red color filter CF1, a green color filter CF2 and a blue color filter CF3. The color filter CF1 is formed of red-colored resin and is disposed in a pixel exhibiting the red color. The color filter CF2 is formed of green-colored resin and is disposed in a pixel exhibiting the green color. The color filter CF3 is formed of blue-colored resin and is disposed in a pixel exhibiting the blue color. Adjacent portions of the color filters CF1 and CF2, and adjacent portions of the color filters CF2 and CF3 are located on the different video signal lines SG.

The insulating layer 15 is located on the color filter layer CF.

The first electrode E1 is located on the insulating layer 15. The first electrode E1 extends across the pixels. In the example illustrated, the first electrode E1 extends just above color filters CF1 to CF3 without being cut just above the video signal lines SG. The first electrode E1 is formed of, for example, a transparent conductive material such as indium tin oxide (ITO), indium zinc oxide (IZO) or indium gallium oxide (IGO).

The insulating layer 16 is located on the first electrode E1.

The common lines CL are in contact with the first electrode E1 just above the video signal lines SG. In the example illustrated, the common lines CL are located on the first electrode E1. The common lines CL are formed of, for example, a metal such as aluminum. The common lines CL have a thickness of, for example, approximately 200 nm. The common lines CL supply a common potential to the first electrode E1. The electric potential of the first electrode E1 may be kept constant, but may be varied together with a scanning cycle for the purpose of reduction of flicker or the like. If the electric potential of the first electrode E1 is varied, the potential variation is often delayed solely since the first electrode E1 is highly resistive as compared with the metal lines. By urging the common lines CL and the first electrode E1 to be in contact with each other as shown in the example illustrated, the resistance of the first electrode E1 can be reduced and the delay in potential variation can be suppressed.

The antireflection layer AR is overlaid on the common line CL just above the video signal line SG. The antireflection layer AR is formed of, for example, titanium nitride. The antireflection layer AR has a thickness of, for example, approximately 160 nm.

A transparent layer TR is located on the antireflection layer AR. In the example illustrated, the transparent layer TR is formed integrally with the insulating layer 16. The insulating layer 16 extends between the first electrode E1 and the second electrode E2, and is in contact with the first electrode E1 and the second electrode E2. The transparent layer TR and the insulating layer 16 are formed of the same material, for example, silicon nitride, and have a refractive index in a range of approximately 1.5 to 2.0. The transparent layer TR may be remote from the insulating layer 16.

As shown in FIG. 4B, width W2 of the common line CL is more than or equal to width W1 of the video signal line SG. The width corresponds to the length in the first direction X, in the cross-sectional view of FIG. 4B. Width W3 of the antireflection layer AR is more than or equal to the width W2 of the common line CL. The common line CL is overlaid on a substantially entire body of the video signal line SG, in planar view, while maintaining the relationship in width. In addition, the antireflection layer AR is overlaid on a substantially entire body of the common line CL in planar view. To suppress the reflection on the side surface of the video signal line SG or the reflection on the side surface of the common line CL, the width W3 of the antireflection layer AR is desirably greater than the width W1 and the width W2.

The transparent layer TR located on the antireflection layer AR has thickness T1. The thickness corresponds to the length in the third direction Z orthogonal to the first direction X and the second direction Y in the cross-sectional view of FIG. 4B. The insulating layer 16 located between the first electrode E1 and the second electrode E2 has thickness T2.

The thickness T1 is smaller than the thickness T2. For example, the thickness T1 is approximately 30 nm and the thickness 12 is approximately 120 nm.

The second electrode E2 is located on the insulating layer 16. The second electrode E2 is disposed in each pixel. The second electrode E2 is remote from the common line CL, the antireflection layer AR, the transparent layer TR and the like. The second electrode E2 is formed of, for example, a transparent conductive material such as ITO, IZO or IGO.

The alignment film AL1 covers the transparent layer TR, the insulating layer 16 and the second electrode E2.

The liquid crystal layer LC is located on the first substrate SUB1. The liquid crystal layer LC may be in a positive type having a positive dielectric anisotropy or a negative type having a negative dielectric anisotropy.

The second substrate SUB2 is located on the liquid crystal layer LC. The second substrate SUB2 includes a support substrate 20, an insulating layer 21, an alignment film AL2 and the like. A polarizer PL2 is disposed on the support substrate 20.

The support substrate 20 is transparent and is formed of, for example, glass such as borosilicate glass, but may be formed of resin such as plastic. The insulating layer 21 is located under the support substrate 20. The insulating layer 21 is a transparent organic insulating layer and is formed of, for example, resin such as acrylic resin. The alignment film AL2 covers the insulating layer 21. The second substrate SUB2 has a transparent area which allows the light to be transmitted toward the upper side of the video signal line SG. In other words, a light-shielding layer is disposed above the video signal line SG, in the second substrate SUB2.

FIG. 5 is a cross-sectional view showing the display panel PNL in line B-B' of FIG. 2. Portions different from those shown in the cross-sectional view of FIG. 4A will be mainly explained here.

The first substrate SUB1 includes a light-shielding layer LS, the switching element SW and the relay electrode RE. The light-shielding layer LS is located between the support substrate 10 and the insulating layer 11. The light-shielding layer LS is formed of, for example, a molybdenum tungsten alloy. The switching element SW comprises a semiconductor layer PS. The semiconductor layer PS is located between the insulating layer 12 and the insulating layer 13. The semiconductor layer PS is formed of, for example, polycrystalline silicon. Two gate electrodes WG serving as parts of the scanning signal line SC are located between the insulating layer 13 and the insulating layer 14. The scanning signal line SC is formed of, for example, a molybdenum tungsten alloy. The video signal line SG and the relay electrode RE are located between the insulating layer 14 and the insulating layer 15. Each of the video signal line SG and the relay electrode RE is in contact with the semiconductor layer PS. The video signal line SG and the relay electrode RE are formed of, for example, metals stacked in order of aluminum, titanium and aluminum. The second electrode E2 extends to the contact hole CH and is in contact with the relay electrode RE.

The second substrate SUB2 includes the light-shielding layer BM. The light-shielding layer BM is located, above the gate electrodes WG and the contact hole CH, between the support substrate 20 and the insulating layer 21.

According to Embodiment 1, the first substrate SUB1 includes the second electrode E2 and any one of the color filters CF1 to CF3, in the pixel of each color. In addition, the liquid crystal layer LC is not interposed between the second electrode E2 and the color filters CF1 to CF3, but the second electrode E2 and the color filters CF1 to CF3 are disposed to be close to each other. For this reason, color mixing can be prevented.

In addition, an installation area of the light-shielding layer BM in the second substrate SUB2 can be reduced since the first substrate SUB1 has a structure for suppressing the reflection on the video signal line SG, as explained later. For this reason, reduction in aperture ratio can be suppressed.

The structure for suppressing the reflection on the video signal line SG will be explained in more detail. If the scanning signal line SC, the video signal line SG and the common line CL, each having a high reflectance, are exposed, the lines reflect external light and cause the contrast ratio to be reduced in a bright environment. In Embodiment 1, the scanning signal line SC is shielded from light by the light-shielding layer BM, and the video signal line SG is shielded from light by the common line CL. For this reason, the scanning signal line SC and the video signal line SG do not become causes for reduction in contrast ratio. In addition, the antireflection layer AR is disposed on the common line CL. For this reason, the amount of the incident light reaching the common line CL is reduced and most of the reflected light from the common line CL is absorbed. Thus, the common line CL does not become the cause for reduction in contrast ratio, either.

Incidentally, if the antireflection layer AR has a thickness of 100 nm or more, the layer absorbs most of the reflected light from the common line CL but has a reflectance of approximately 10% in the interface between the antireflection layer AR and air.

In Embodiment 1, the transparent layer TR is located on the antireflection layer AR. For example, the transparent layer TR has a refractive index of 1.9. The antireflection layer AR located under the transparent layer TR has a refractive index of 1.4 and an extinction coefficient of 0.7. The alignment film AL1 located on the transparent layer TR has a refractive index of 1.6. Under these conditions, the reflected light intensity generated in the interface between the transparent layer TR and the antireflection layer AR becomes substantially equal to the reflected light intensity generated in the interface between the transparent layer TR and the alignment film AL1, and the transparent layer TR thus functions as an interference film.

When the reflected light beams in the upper and lower interfaces in the transparent layer TR are overlaid, if a phase difference of the reflected light beams is 0.5 wavelengths, the light beams cancel each other and the effect of reducing the reflected light intensity can be obtained. In general, the condition for the reflected light beams to cancel each other by the interference effect can be represented by the following expression.

$$0.5 + i = 2nd/\lambda \cos \theta$$

where i represents an integer of 0 or more, $\theta$ represents a polar angle of the incident angle ($\theta=0°$ in the normal line of the substrate), and $\lambda$ is a wavelength of the incident light. In addition, d represents the thickness of the transparent layer TR and n represents the refractive index of the transparent layer TR. Thus, i conditions for the reflected light beams to cancel each other by the interference effect exist, and each of the conditions is called the $i^{th}$-order interference condition.

FIG. 6 is a graph representing dependency of reflectance on a thickness of a transparent layer TR at a wavelength of 555 nm. In the graph, the horizontal axis (Thickness of TR) ($\mu$m) represents the thickness of the transparent layer TR while the vertical axis (Reflectance) (%) represents the reflectance. It can be understood from the graph that the minimum value of the reflectance appears periodically together with the thickness of the transparent layer TR as shown in the graph. The condition for the phase difference to be 0.5 wavelengths is zero-order interference condition where i=0, and corresponds to the minimum value of the thickness of the thinnest transparent layer TR, of the minimum values in the graphs. The thickness dependency is simulated by assuming that the transparent layer TR is formed of silicon nitride and has a refractive index of 1.9. In FIG. 6, the horizontal axis (Thickness of TR), i.e., the interval of the thickness of the transparent layer TR in a case where the vertical axis (Reflectance), i.e., the reflectance becomes minimum corresponds to the above-explained expression.

If the transparent layer TR is used as the interference film for suppressing the reflection instead of the light-shielding layer BM, the reflectance less than or equal to that of the light-shielding layer BM is practically required to be achieved. Considering that the reflectance is approximately 1% in a case where the light-shielding layer BM is formed of resist containing black pigment, the thickness conditions for the reflectance of the transparent layer TR to be 2% or less under the zero-order interference condition is 10 nm or more and 40 nm or less, more desirably, 15 nm or more and 35 nm or less. It should be noted that the refractive index of the transparent layer TR is often varied under the condition for film formation. Even if the refractive index of the transparent layer TR is varied, however, the deviation from the thickness range in which the zero-order interference condition can be obtained is smaller than the deviation from the thickness range in which the higher-order interference condition can be obtained with respect to the thickness dependency.

FIG. 7 is a graph representing reflection spectra in a case where the thickness of the transparent layer TR satisfies zero-order, first-order, and second-order interference conditions. The reflection spectra represent reflection spectra in the direction of the normal line of the display panel PNL, i.e., a direction parallel to a third direction Z in FIG. 45. In the graph, solid line A, broken line B and one-dot-chained line C represent the reflection spectra under the zero-order, first-order and second-order interference conditions, respectively. In addition, in the configuration of the present embodiment, thicknesses of the transparent layer TR satisfying the zero-order, first-order and second-order interference conditions are 30 nm, 170 nm and 300 nm, respectively.

As shown in the graph, the reflectance in a case where the wavelength is 555 nm is approximately the same under any interference conditions. The wavelength dependency of the reflectance becomes greater under higher-order interference conditions, and the reflectance is radically increased as the wavelength is remote from 555 nm. As a result, the reflectance in the entire visible wavelength range from, for example, 380 nm to 780 nm is increased under the higher-order interference conditions. In other words, it was recognized that the effect of suppressing the reflection is degraded under the higher-order interference conditions.

Since the luminosity of the human is maximum in the visible range of wavelengths 555 nm, the thickness of the transparent layer RE and the like are determined by setting $\lambda$ at 555 nm, but reducing the reflectance in a wider range of the visible range of wavelengths including 555 nm is more desirable. The zero-order interference condition can reduce the reflected light intensity in the substantially entire visible range of wavelengths as compared with the higher-order interference conditions.

FIG. 8 shows graphs representing dependency of the reflection spectra on a polar angle under the interference conditions of the respective orders. In the graphs, (a), (b) and (c) represent the reflection spectra under the zero-order, first-order and second-order interference conditions, respectively. In each of the graphs, a solid line, a broken line, a one-dot-chained line and a two-dot-chained line represent the reflection spectra at the polar angles of zero, twenty, forty, and sixty degrees, respectively. The polar angle of zero degree corresponds to a direction parallel to the third direction Z in FIG. 4B, and the polar angles of twenty, forty, and sixty degrees correspond to directions angled at twenty, forty, and sixty degrees with respect to the third direction Z, respectively.

As shown in the graphs, each of the interference conditions has the dependency on the polar angle. For this reason, even if the thickness of the transparent layer TR is set to satisfy the interference condition at the polar angle of zero degree, the reflectance may be unable to be sufficiently lowered in a direction in which the polar angle is other than zero degree. In particular, it was recognized that differences in reflection spectra at the polar angles become remarkable under the higher-order interference conditions. In contrast, under the zero-order interference condition, the reflectance is least increased with the increasing polar angle and the low reflectance can be obtained irrespective of the incident angle of light or the direction of visible recognition of light, as compared with the higher-order interference conditions.

Figure 9:
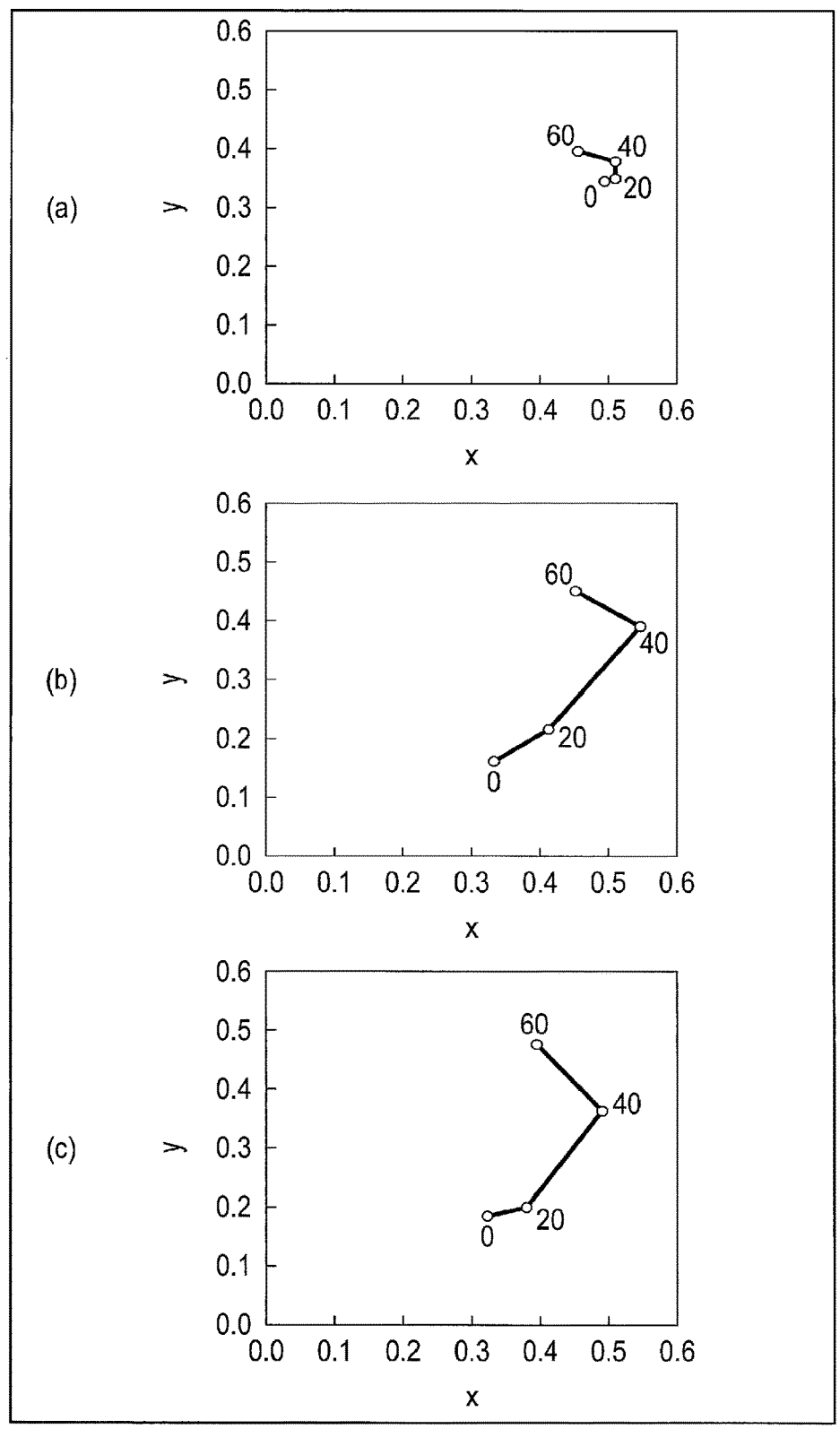
FIG. 9 shows graphs representing color chromaticity of reflected light under the interference conditions of the respective orders.

FIG. 9 shows graphs representing color chromaticity of reflected light under the interference conditions of the respective orders. In the graphs, (a), (b) and (c) represent color chromaticity the reflection spectra under the zero-order, first-order and second-order interference conditions, respectively. In each of the graphs, numbers zero, twenty, forty, and sixty represent the color chromaticity at the polar angles of zero, twenty, forty, and sixty degrees, respectively. In (a), (b) and (c) of FIG. 9, the color chromaticity of the reflection spectra shown in (a), (b) and (c) of FIG. 8 is plotted in NTSC1931xy color system.

It was recognized that under the interference condition of any order, the color chromaticity moves in the color system with the increasing polar angle, but the movement amount is increased as the order is higher. In contrast, the reflection spectrum in which the variation in color chromaticity is small and the hue is substantially constant even if the polar angle becomes great can be obtained under the zero-order interference condition.

According to Embodiment 1, the transparent layer TR has the thickness which satisfies the zero-order interference condition, for example, 30 nm, at the portion overlaid on the antireflection layer AR. Thus, the reflection on the antireflection layer AR can be suppressed and the reduction in contrast ratio can be suppressed. Furthermore, the reflectance can be reduced substantially constantly and the variation in color chromaticity can be suppressed, irrespective of the direction of observation of the display panel PNL. Display quality can be therefore improved.

In addition, the insulating layer 16 extending between the first electrode E1 and the second electrode E2 has the thickness, for example, 120 nm, greater than the transparent layer TR overlaid on the antireflection layer AR. Thus, storage capacitance which can store a sufficient voltage during a hold period can be formed and short circuit of the first electrode E1 and the second electrode E2 can be suppressed.

A method of forming the transparent layer TR and the insulating layer 16 will be explained in brief.

In a first forming method, first, the first electrode E1, the common line CL and the antireflection layer AR are formed, and then a silicon nitride film is formed on the entire surface. After that, the silicon nitride film is completely removed from the portion overlaid on the antireflection layer AR. After that, a silicon nitride film is formed again on the entire surface, and the thickness which satisfies the zero-order interference condition is obtained at the portion overlaid on the antireflection layer AR. The transparent layer TR and the insulating layer 16 are thereby formed.

In a second forming method, first, the first electrode E1, the common line CL and the antireflection layer AR are formed, and then a silicon nitride film is formed on the entire surface. After that, the thickness of the silicon nitride film is reduced at the portion overlaid on the antireflection layer AR, and the thickness which satisfies the zero-order interference condition is obtained. The transparent layer TR and the insulating layer 16 are thereby formed.

Modified Example 1

FIG. 10 is a cross-sectional view showing a display panel PNL in Modified Example 1 of Embodiment 1. Modified Example 1 shown in FIG. 10 is different from the display panel PNL shown in FIG. 4A with respect to a feature that the transparent layer TR is an organic insulating layer. The other constituent elements are the same as those of the display panel shown in FIG. 4A and denoted by the same reference numbers, and their explanations will be omitted.

In the example illustrated, the transparent layer TR is formed integrally with the insulating layer 16 extending between the first electrode E1 and the second electrode E2. The transparent layer TR and the insulating layer 16 are formed of the same resin material.

For example, the transparent layer TR and the insulating layer 16 are formed in a manner explained below. The first electrode E1, the common line CL and the antireflection layer AR are formed and then the organic film is formed on the entire surface. The organic film has fluidity since the organic film contains a solvent at the formation. Since a stacked body of the common line CL and the antireflection layer AR protrudes upwardly from the first electrode E1, the formed organic film flows from an upper part of the stacked body to the first electrode E1. After that, the solvent is removed by drying the organic film, and the organic film is cured. Thus, the thin transparent layer TR is formed on the antireflection layer AR, and the insulating layer 16 thicker than the transparent layer TR is formed on the first electrode E1.

According to Modified Example 1, the same advantages as those of Embodiment 1 can be obtained. In addition, the transparent layer TR and the insulating layer 16 having a desired thickness can be formed by only forming the organic film without performing additional processing, with the fluidity of the organic film at the formation. Gentle slopes are formed on side surfaces of the stacked body of the common line CL and the antireflection layer AR by curing the organic film flowing from the upper part of the antireflection layer AR to the first electrode E1. As a result, steps between the stacked body and the first electrode E1 can be reduced, disorder in alignment of the liquid crystal molecules around the stacked body can be suppressed, and the reduction in contrast ratio can be suppressed.

Embodiment 2

FIG. 11 and FIG. 12 are cross-sectional views showing a display panel PNL of Embodiment 2. It should be noted that FIG. 11 is a cross-sectional view in line A-A' of FIG. 2 while FIG. 12 is a cross-sectional view in line B-B' of FIG. 2. Embodiment 2 is different from Embodiment 1 with respect to features that a transparent layer TR is formed of the same material as the material of a second electrode E2, that the transparent layer TR is remote from the second electrode E2, and that the transparent layer TR and the second electrode E2 are disposed in the same layer.

As shown in the drawings, an insulating layer 16 is located on a first electrode E1 and under the second electrode E2. The insulating layer 16 exposes a antireflection layer AR. A transparent layer TR is located on the antireflection layer AR. In the example illustrated, a part of the transparent layer TR is located on the insulating layer 16, but is not joined to the second electrode E2. The transparent layer TR and the second electrode E2 are formed of a transparent conductive material such as ITO, IZO or IGO. Since ITO has, for example, substantially the same refractive index as silicon nitride, the transparent layer TR may be set to have the same thickness as explained in Embodiment 1 to satisfy the zero-order interference condition. The transparent layer TR and the second electrode E2 have the same thickness. An alignment film AL1 covers the transparent layer TR and the second electrode E2. The alignment film AL1 covers the insulating layer 16 at a position between the transparent layer TR and the second electrode E2.

The transparent layer TR and the second electrode E2 are formed, for example, in a manner explained below. First, the first electrode E1, a common line CL and the antireflection layer AR are formed, and then a silicon nitride film is formed on the entire surface. After that, the silicon nitride film is completely removed from the portion overlaid on the antireflection layer AR. Then, an ITO film is formed on the entire surface and subjected to patterning in accordance with the shapes of the transparent layer TR and the second electrode E2 by a photolithographic process. Thus, the transparent layer TR having a thickness which satisfies the zero-order interference condition is formed on the antireflection layer AR, and the second electrode E2 is formed on the insulating layer 16.

In Embodiment 2, too, the same advantages as those of Embodiment 1 can be obtained.

Embodiment 3

Figure 14:
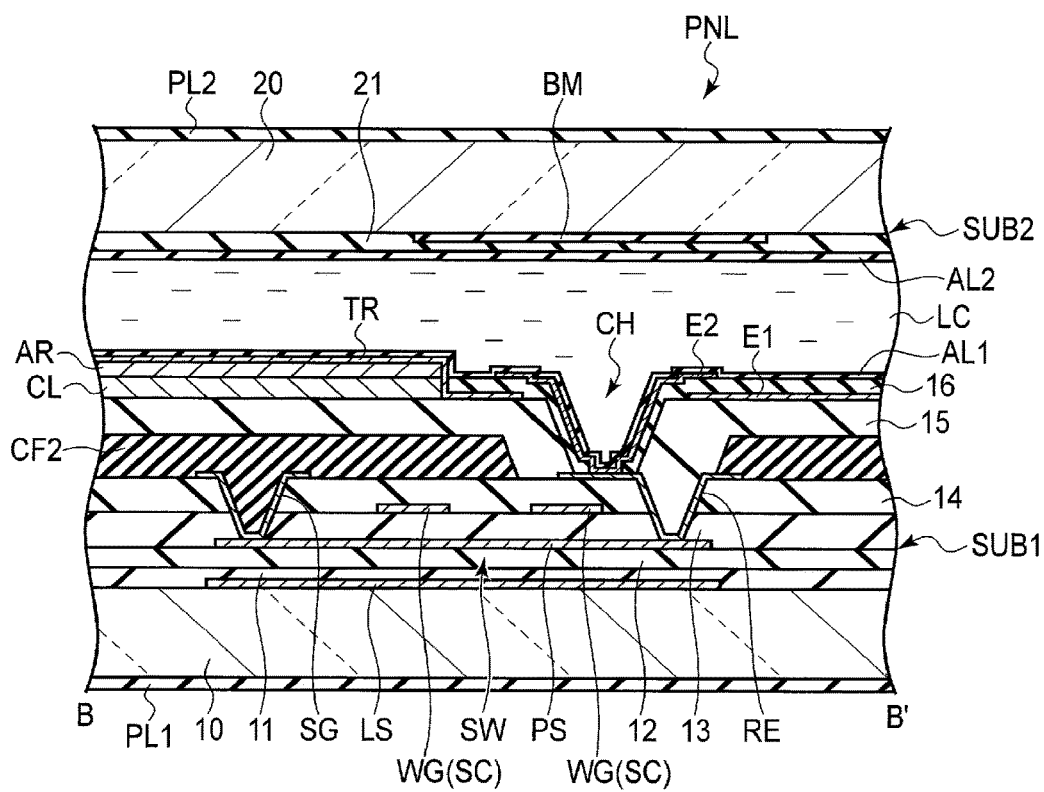
FIG. 14 is a cross-sectional view showing the display panel PNL of Embodiment 3.

FIG. 13 and FIG. 14 are cross-sectional views showing a display panel PNL of Embodiment 3. FIG. 13 is a cross-sectional view in line A-A' of FIG. 2 while FIG. 14 is a cross-sectional view in line B-B' of FIG. 2. Embodiment 3 is different from Embodiment 1 with respect to features that a transparent layer TR is formed of the same material as the material of a first electrode E1 and that the transparent layer TR is electrically connected to a first electrode E1.

As shown in the drawings, a common line CL is located on an insulating layer 15. The first electrode E1 is located on the insulating layer 15 and is in contact with side surfaces of the common line CL. A transparent layer TR is located on the antireflection layer AR. The transparent layer TR is formed integrally with the first electrode E1. The transparent layer TR and the first electrode E1 are formed of a transparent conductive material such as ITO, IZO or IGO. An insulating layer 16 is located on the first electrode E1 and under the second electrode E2. The insulating layer 16 exposes the transparent layer TR. An alignment film AL1 covers the transparent layer TR and the second electrode E2. The alignment film AL1 covers the insulating layer 16 at a position between the transparent layer TR and the second electrode E2.

In Embodiment 3, too, the same advantages as those of Embodiment 1 can be obtained.

Modified Example 2

Figure 15:
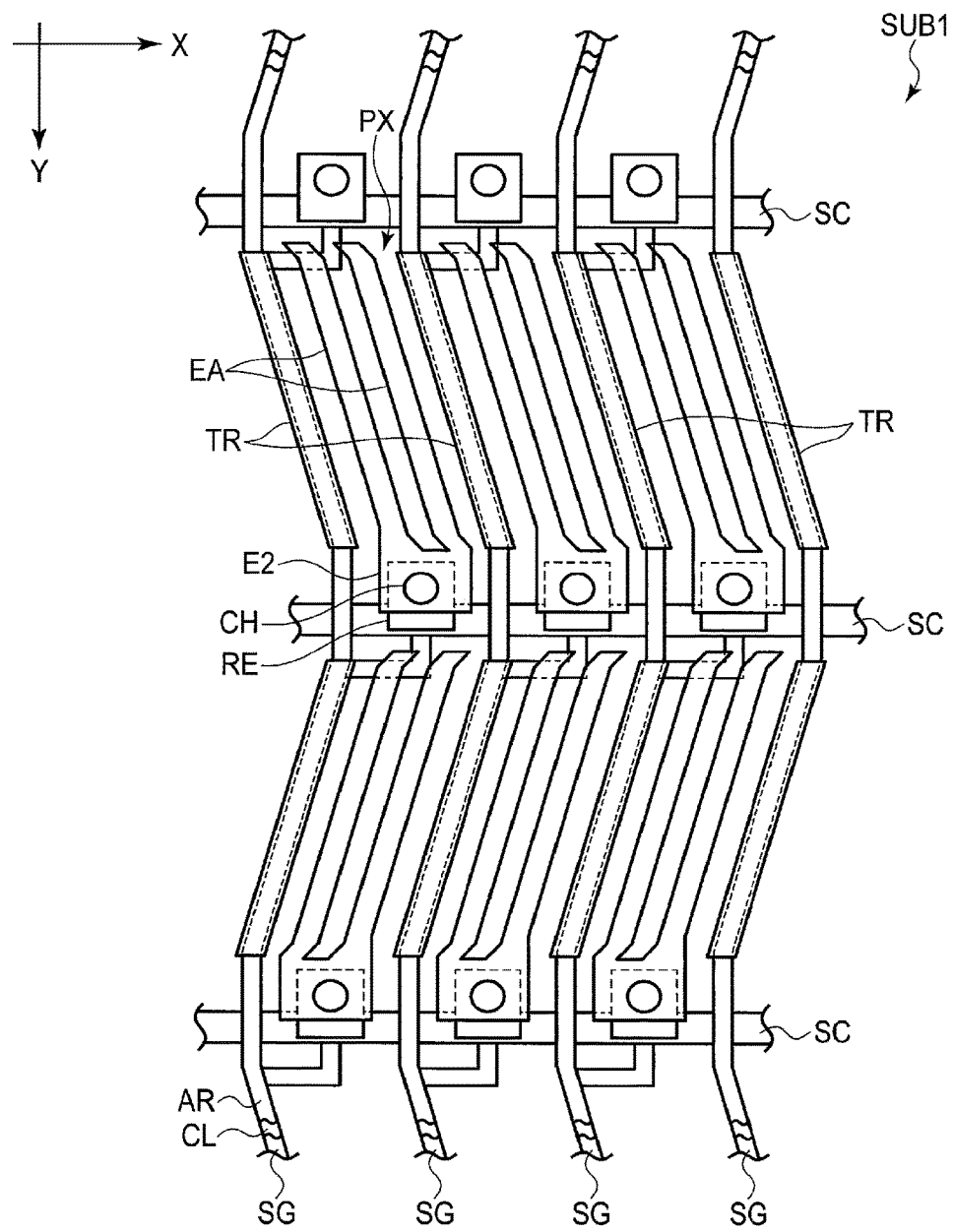
FIG. 15 is a plan view showing a first substrate SUB1 in Modified Example 2 of Embodiment 2 and Modified Example 2 of Embodiment 3.

FIG. 15 is a plan view showing a first substrate SUB1 in Modified Example 2 of Embodiment 2 and Modified Example 2 of Embodiment 3. Modified Example 2 shown in FIG. 15 is different from Embodiment 2 shown in FIG. 11 and Embodiment 3 shown in FIG. 13 with respect to a feature that the transparent layer TR of each of Embodiment 2 shown in FIG. 11 and Embodiment 3 shown in FIG. 13 is located on an entire body of the antireflection layer AR while the transparent layer TR is located on a part of the antireflection layer AR in Modified Example 2 shown in FIG. 13.

The second electrode E2 is formed to comprise strip electrodes EA at a central portion of the unit PX and cover the surrounding of the contact hole CH.

The transparent layers TR are arranged in the first direction X of the strip electrodes EA. The transparent layers TR are not disposed at a position arranged in the first direction X of the contact hole CH and the relay electrode RE. In other words, the transparent layers TR are scattered on the antireflection layer AR.

According to Modified Example 2, since intervals in the first direction X between the second electrode E2 and the transparent layers TR can be secured sufficiently, short circuit between the transparent layers TR electrically connected with the first electrode E1, and the second electrode E2 capable of having a potential different from the first electrode E1 can be suppressed. It should be noted that the antireflection layer AR arranged with the contact hole CH and the relay electrode RE is opposed to the light-shielding layer BM of the second substrate SUB2 as shown in FIG. 3. For this reason, reflection at a portion which is not overlaid on the transparent layer TR, of the antireflection layer AR, can be suppressed.

Embodiment 4

Figure 17:
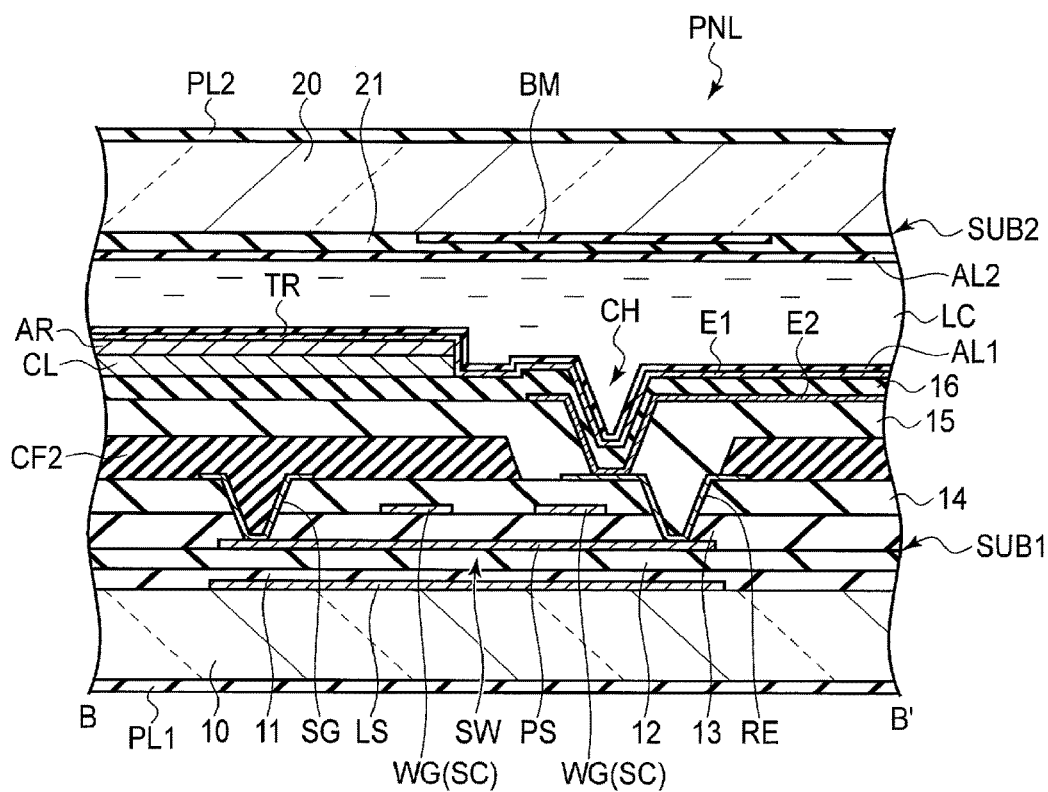
FIG. 17 is a cross-sectional view showing the display panel PNL of Embodiment 4.

FIG. 16 and FIG. 17 are cross-sectional views showing a display panel PNL of Embodiment 4. It should be noted that FIG. 16 is a cross-sectional view in line A-A' of FIG. 2 while FIG. 17 is a cross-sectional view in line B-B' of FIG. 2. Embodiment 4 is different from Embodiment 1 with respect to a feature that a first electrode E1 of a common potential is located at an upper position than a second electrode E2.

As shown in the drawings, the second electrode E2 is located on an insulating layer 15. The second electrode E2 extends to the contact hole CH penetrating the insulating layer 15 and is in contact with a relay electrode RE. An insulating layer 16 is located on the second electrode E2 and under the first electrode E1 and the common line CL. A transparent layer TR is located on the antireflection layer AR. The transparent layer TR is formed integrally with the first electrode E1. The first electrode E1 includes an opening portion OP represented by a broken line, just on the second electrode E2. The insulating layer 16 and the first electrode E1 extend to the contact hole CH. An alignment film AL1 covers the transparent layer TR and the first electrode E1. The alignment film AL1 covers the insulating layer 16 at the opening portion OP.

In Embodiment 4, too, the same advantages as those of Embodiment 1 can be obtained. In addition, since the second electrode E2 is located more closely to the relay electrode RE side than the first electrode E1, the contact hole CH can be formed to be shallower and have a smaller diameter as compared with Embodiment 1. For this reason, the area contributing to the display can be expanded in the pixel.

Embodiment 5

FIG. 18 is a cross-sectional view showing a display panel PNL of Embodiment 5. It should be noted that FIG. 18 is a cross-sectional view in line B-B' of FIG. 2. Embodiment 5 is different from Embodiment 4 with respect to a feature that a antireflection layer AR and a transparent layer TR are located on a scanning signal line SC or a gate electrode WG. As shown in the drawing, a stacked body of a common line CL, a antireflection layer AR and a transparent layer TR is also located on a relay electrode RE and a contact hole CH. For this reason, reflection on the scanning signal line SC can be suppressed on the first substrate SUB1.

A light-shielding layer for shielding the scanning signal line SC and the contact hole CH from light is unnecessary for the second substrate SUB2. An insulating layer for suppressing diffusion of impurities from the light-shielding layer to the liquid crystal layer is also unnecessary for the second substrate SUB2.

According to Embodiment 5, the same advantages as those of Embodiment 1 can be obtained and the structure of the second substrate SUB2 can be simplified.

Embodiment 6

FIG. 19 is a cross-sectional view showing a display panel PNL of Embodiment 6. It should be noted that FIG. 19 is a cross-sectional view in line A-A' of FIG. 2. Embodiment 6 is different from Embodiment 1 with respect to a feature that color filters CF1 to CF3 are located on an insulating layer 15. In the example illustrated, a first electrode E1 is located at a lower position than a second electrode E2, and the color filters CF1 to CF3 are in contact with the first electrode E1. If the structure of Embodiment 4 shown in FIG. 16 or the like is applied, the color filters CF1 to CF3 are in contact with the second electrode E2.

In Embodiment 6, too, the same advantages as those of Embodiment 1 can be obtained.

The insulating layer 15 may not be disposed in each of the above-explained embodiments. The structure of a first substrate SUB1 can be further simplified.

In addition, each pixel PX may be bent to be shaped in a letter V in each of the above-explained embodiments.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A liquid crystal display device, comprising:
a first substrate including a support substrate, a scanning signal line, a video signal line, a first electrode, a color filter, a common line in contact with the first electrode along the video signal line, an antireflection layer located on the common line, a transparent layer located on the antireflection layer, a second electrode, and an alignment film;
a liquid crystal layer located on the first substrate; and
a second substrate located on the liquid crystal layer, wherein
the transparent layer has a thickness of 10 nm or more and 40 nm or less,
the transparent layer has a first surface which faces the liquid crystal layer,
the second electrode has a second surface which faces the liquid crystal layer,
the alignment film is in contact with the first surface and the second surface,
the transparent layer is between the alignment film and the common line, and
a first distance from the support substrate to the first surface is larger than a second distance from the support substrate to the second surface.

2. The liquid crystal display device of claim 1, wherein
the first substrate further includes an insulating layer which is disposed between the first electrode and the second electrode and which is in contact with the first electrode and the second electrode,
a thickness of the antireflection layer is larger than a thickness of the insulating layer, and
a thickness of the common line is larger than the thickness of the antireflection layer.

3. The liquid crystal display device of claim 2, wherein the transparent layer and the insulating layer are formed of a same material.

4. The liquid crystal display device of claim 3, wherein the transparent layer is formed of silicon nitride.

5. The liquid crystal display device of claim 4, wherein the transparent layer on the antireflection layer is thinner than the insulating layer.

6. The liquid crystal display device of claim 2, wherein
the common line has a fourth surface which is in contact with the antireflection layer,
the insulating layer has a fifth surface which is in contact with the second electrode, and
a distance from the support substrate to the fourth surface is larger than a distance from the support substrate to the fifth surface.

7. The liquid crystal display device of claim 1, wherein the transparent layer is an organic insulating layer.

8. The liquid crystal display device of claim 1, wherein the transparent layer is formed of a same material as the second electrode and is remote from the second electrode.

9. The liquid crystal display device of claim 8, wherein the first substrate further includes an insulating layer located under the second electrode and disposed on a side of the antireflection layer, and an alignment film covering the transparent layer and the second electrode.

10. The liquid crystal display device of claim 1, wherein the transparent layer is formed of a same material as the first electrode and is electrically connected with the first electrode.

11. The liquid crystal display device of claim 10, wherein the first substrate further includes an insulating layer located under the second electrode to expose the transparent layer, and an alignment film covering the transparent layer and the second electrode.

12. The liquid crystal display device of claim 10, wherein the first substrate further includes an insulating layer located under the first electrode and the common line, and an alignment film covering the transparent layer and the first electrode.

13. The liquid crystal display device of claim 1, wherein the antireflection layer and the transparent layer are located on the scanning signal line.

14. The liquid crystal display device of claim 1, wherein the color filter is in contact with any one of the first electrode and the second electrode.

15. The liquid crystal display device of claim 1, wherein the second substrate includes a transparent area above the video signal line.

16. The liquid crystal display device of claim 1, wherein the alignment film has a third surface which is in contact with the liquid crystal layer just above the transparent layer, and the third surface protrudes toward the liquid crystal layer.

17. The liquid crystal display device of claim 1, wherein the alignment film has a recessed portion between the transparent layer and the second electrode.

18. The liquid crystal display device of claim 1, wherein a thickness of the common line is larger than a thickness of the antireflection layer, a thickness of the antireflection layer is larger than the thickness of the transparent layer.

* * * * *